US012113802B2

(12) United States Patent
Minamikawa

(10) Patent No.: US 12,113,802 B2
(45) Date of Patent: Oct. 8, 2024

(54) AUTHENTICATION SYSTEM, AUTHENTICATION SERVER, AND NON-TRANSITORY COMPUTER READABLE MEDIUM STORING PROGRAM

(71) Applicant: FUJIFILM Business Innovation Corp., Tokyo (JP)

(72) Inventor: Takahiro Minamikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 256 days.

(21) Appl. No.: 17/575,597

(22) Filed: Jan. 13, 2022

(65) Prior Publication Data
US 2023/0081801 A1 Mar. 16, 2023

(30) Foreign Application Priority Data
Sep. 15, 2021 (JP) .................... 2021-150489

(51) Int. Cl.
*H04L 9/40* (2022.01)
(52) U.S. Cl.
CPC ............ *H04L 63/107* (2013.01); *H04L 63/08* (2013.01)
(58) Field of Classification Search
CPC .............................. H04L 63/08; H04L 63/107
See application file for complete search history.

(56) References Cited

U.S. PATENT DOCUMENTS

| | | | | | |
|---|---|---|---|---|---|
| 7,606,938 | B2* | 10/2009 | Roese | ............... | H04L 63/107 701/472 |
| 7,706,369 | B2* | 4/2010 | Roese | ............... | H04L 67/52 370/392 |
| 7,739,402 | B2* | 6/2010 | Roese | ............... | H04W 4/02 713/168 |
| 7,898,977 | B2* | 3/2011 | Roese | ............... | H04W 4/02 370/254 |
| 8,725,888 | B2* | 5/2014 | Short | ............... | H04L 41/0896 709/219 |
| 8,725,899 | B2* | 5/2014 | Short | ............... | H04L 63/08 709/227 |
| 8,909,247 | B2* | 12/2014 | Tipton | ............... | H04W 12/08 455/456.1 |
| 8,972,589 | B2* | 3/2015 | Roese | ............... | H04L 41/12 709/219 |
| 9,232,399 | B2* | 1/2016 | Tipton | ............... | H04L 67/306 |

(Continued)

FOREIGN PATENT DOCUMENTS

| | | |
|---|---|---|
| JP | 2015062139 | 4/2015 |
| JP | 2017194972 | 10/2017 |
| JP | 2019139457 | 8/2019 |

*Primary Examiner* — Sharon S Lynch
(74) *Attorney, Agent, or Firm* — JCIPRNET

(57) ABSTRACT

An authentication system includes an authentication server that has a first processor and authenticates a user who uses a terminal to which a login request for a network system has been transmitted, and a first terminal that has a second processor and is used by a user who is not permitted to log in to the network system, in which the first processor is configured to permit the first terminal to log in to the network system in a case where the first terminal is capable of being verified to be located in a specific space where a user who is permitted to log in to the network system is locatable in response to a login request from the first terminal.

8 Claims, 8 Drawing Sheets

(56) References Cited

U.S. PATENT DOCUMENTS

| | | | |
|---|---|---|---|
| 9,237,139 B2* | 1/2016 | Shaikh | H04L 63/08 |
| 9,386,004 B2* | 7/2016 | Glickfield | H04L 51/046 |
| 9,531,578 B2* | 12/2016 | Gilson | H04L 67/51 |
| 9,667,660 B2* | 5/2017 | Tipton | H04L 63/20 |
| 10,084,824 B2* | 9/2018 | Tipton | H04W 12/06 |
| 10,237,261 B2* | 3/2019 | Raounak | H04L 43/106 |
| 10,257,179 B1* | 4/2019 | Saylor | H04W 12/068 |
| 10,341,243 B2* | 7/2019 | Short | G06Q 30/04 |
| 10,362,066 B2* | 7/2019 | Tipton | H04L 67/52 |
| 10,447,699 B2* | 10/2019 | Liu | H04W 12/06 |
| 10,594,739 B2* | 3/2020 | Tipton | H04W 12/04 |
| 11,005,834 B2* | 5/2021 | Liu | H04W 4/02 |
| 11,212,320 B2* | 12/2021 | Tipton | H04L 67/52 |
| 11,689,925 B2* | 6/2023 | Hotchkiss | H04W 12/08 726/4 |
| 2003/0216144 A1* | 11/2003 | Roese | H04L 67/51 455/456.2 |
| 2003/0217122 A1* | 11/2003 | Roese | H04L 67/04 709/219 |
| 2003/0217137 A1* | 11/2003 | Roese | H04L 67/52 726/5 |
| 2003/0225893 A1* | 12/2003 | Roese | H04L 41/12 709/227 |
| 2006/0277187 A1* | 12/2006 | Roese | H04L 63/104 707/999.009 |
| 2008/0155094 A1* | 6/2008 | Roese | H04L 63/107 709/224 |
| 2010/0022254 A1* | 1/2010 | Ashfield | H04L 63/107 455/456.6 |
| 2010/0031334 A1* | 2/2010 | Shaikh | H04L 63/08 709/224 |
| 2012/0328101 A1* | 12/2012 | Lakshminarayanan | H04L 63/0823 380/258 |
| 2013/0115915 A1* | 5/2013 | Tipton | H04L 67/306 455/411 |
| 2014/0007211 A1 | 1/2014 | Yang et al. | |
| 2014/0047093 A1* | 2/2014 | Short | G06Q 50/163 709/223 |
| 2014/0059222 A1* | 2/2014 | Short | H04L 12/14 709/225 |
| 2014/0157381 A1* | 6/2014 | Disraeli | H04L 63/0853 726/7 |
| 2015/0058956 A1* | 2/2015 | Tipton | H04L 67/52 726/7 |
| 2015/0113621 A1* | 4/2015 | Glickfield | H04L 51/046 726/7 |
| 2015/0327060 A1* | 11/2015 | Gilson | H04W 76/11 726/7 |
| 2016/0099973 A1* | 4/2016 | Tipton | H04L 67/306 726/1 |
| 2016/0156635 A1* | 6/2016 | Liu | H04L 63/102 726/4 |
| 2017/0264645 A1* | 9/2017 | Tipton | H04W 12/06 |
| 2018/0041395 A1* | 2/2018 | Short | H04L 63/0892 |
| 2018/0091493 A1* | 3/2018 | Raounak | H04W 4/025 |
| 2018/0240101 A1* | 8/2018 | Chan | G06Q 20/3224 |
| 2019/0007459 A1* | 1/2019 | Tipton | H04L 63/08 |
| 2019/0104411 A1* | 4/2019 | Hotchkiss | H04W 12/08 |
| 2019/0289037 A1* | 9/2019 | Tipton | H04L 63/20 |
| 2019/0394205 A1* | 12/2019 | Liu | H04W 4/02 |
| 2020/0195692 A1* | 6/2020 | Tipton | H04L 67/52 |
| 2021/0036988 A1* | 2/2021 | Mckibben | H04W 12/06 |
| 2022/0086191 A1* | 3/2022 | Tipton | H04W 12/04 |
| 2023/0283994 A1* | 9/2023 | Shi | H04W 4/12 370/329 |

* cited by examiner

FIG. 2

APPROVAL POLICY TABLE

| CONNECTION SOURCE AP | IP ADDRESS | APPROVAL METHOD |
|---|---|---|
| AP1 | 123. 123. 123. 1 | SMART CARD AND OTHER CERTIFICATES |
| AP2 | 123. 123. 123. 2 | POSITION INFORMATION |
| AP3 | 123. 123. 123. 3 | PASSWORD |
| AP4 | 123. 123. 123. 4 | DELEGATION |
| ... | | ... |

FIG. 3

BEACON MANAGEMENT TABLE

| BEACON | EFFECTIVE DISTANCE [cm] | CONNECTED AP | ROOM NUMBER |
|---|---|---|---|
| bc1 | 50 | AP1 | rm101 |
| bc2 | 100 | AP2 | rm302 |
| bc3 | 200 | AP3 | rm703 |
| ... | ... | | |

FIG. 4

ROOM INFORMATION TABLE

| ROOM NUMBER | BEACON | AP | MAP INFORMATION |
|---|---|---|---|
| rm101 | bc1 | AP1 | |
| rm302 | bc2 | AP2 | |
| rm703 | bc3 | AP3 | |
| ... | ... | | |

FIG. 7

ACCESS POINT MANAGEMENT TABLE

| AP | IP ADDRESS | MANAGEMENT TERMINAL | DELEGATION DESTINATION |
|---|---|---|---|
| AP1 | 123. 123. 123. 1 | Z | ALL Authorities |
| AP2 | 123. 123. 123. 2 | Y | NONE |
| AP4 | 123. 123. 123. 3 | X | ONLY MANAGEMENT TERMINAL |
| ... | 123. 123. 123. 4 | ... | |

FIG. 8

APPROVED TERMINAL MANAGEMENT TABLE

| TERMINAL | USER | Role | PUBLIC KEY |
|---|---|---|---|
| A | user A | Normal user | aaaaaaaaa |
| B | user B | Authority | bbbbbbbb |
| X | user X | Authority | cccccccccc |
| ... | | ... | |

FIG. 9

CONNECTED TERMINAL TABLE

| CONNECTED TERMINAL | IP ADDRESS | CONNECTION SOURCE AP | salt |
|---|---|---|---|
| A | 123. 123. 123. 101 | AP3 | xxxx |
| B | 123. 123. 123. 102 | AP1 | yyyy |
| X | 123. 123. 123. 124 | AP4 | zzzz |
| ... | | ... | |

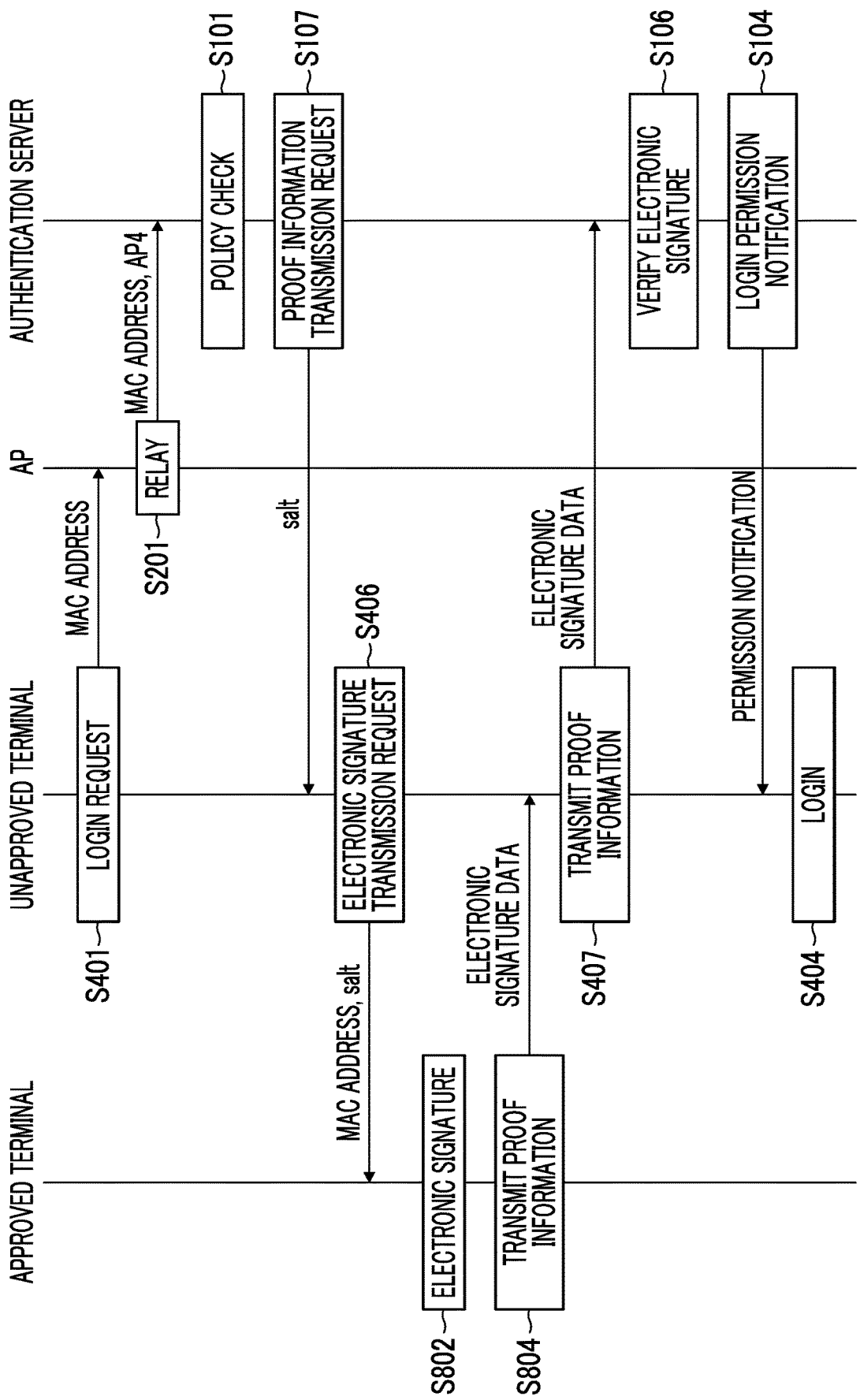

ND NON-TRANSITORY COMPUTER READABLE
AUTHENTICATION SYSTEM, AUTHENTICATION SERVER, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-150489 filed Sep. 15, 2021.

BACKGROUND

(i) Technical Field

The present invention relates to an authentication system, an authentication server, and a non-transitory computer readable medium storing a program.

(ii) Related Art

In recent years, there has been an increasing tendency for large companies to collaborate with start-up companies or freelancers to do business. In this case, in terms of work efficiency, for example, an engineer of a start-up company or the like that collaborates with a large company visits the large companies and connects a terminal device carried by the engineer to an in-house system of the large company via a network such that collaboration can be performed as a team.

However, on the other hand, security of a company tends to be strengthened, and in many cases, the company is operated such that outsiders cannot easily log in to a company network system.

On the premise of such a company network system environment, in a case where an outsider, that is, a user who is not permitted to log in to the network system is desired to log in, for example, the login is supported by giving authentication information such as a one-time password to the outsider under the control of the company.

SUMMARY

A user who is not permitted to log in to a network system such as an in-house system usually acts with a user who is permitted to log in to network system, such as an employee of the company who collaborates within the company's facility or performs work in a room such as a conference room where security is maintained without moving around freely in the facility. That is, it is considered that a location of the user who is not permitted to log in to the network system, in other words, a location of a terminal used by the user in the facility is placed in an environment where security is guaranteed to some extent. Therefore, in a case where it can be proved that the location of the terminal used by the user who is not permitted to log in to the network system is in a place where security is guaranteed, it is considered that login may be permitted.

Aspects of non-limiting embodiments of the present disclosure relate to an authentication system, an authentication server, and a non-transitory computer readable medium storing a program, which improve a security level of a network system compared with a case where a location of a terminal used by a user who is not permitted to log in to the network system is not taken into consideration.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an authentication system including an authentication server that has a first processor and authenticates a user who uses a terminal to which a login request for a network system has been transmitted, and a first terminal that has a second processor and is used by a user who is not permitted to log in to the network system, in which the first processor is configured to permit the first terminal to log in to the network system in a case where the first terminal is capable of being verified to be located in a specific space where a user who is permitted to log in to the network system is locatable in response to a login request from the first terminal.

BRIEF DESCRIPTION OF THE DRAWINGS

Exemplary embodiment(s) of the present invention will be described in detail based on the following figures, wherein:

FIG. 2 is a diagram showing an example of an approval policy table in Exemplary Embodiment 1;

FIG. 3 is a diagram showing an example of a beacon management table in Exemplary Embodiment 1;

FIG. 4 is a diagram showing an example of a room information table in Exemplary Embodiment 1;

FIG. 7 is a diagram showing an example of an access point management table in Exemplary Embodiment 2;

FIG. 8 is a diagram showing an example of an approved terminal management table in Exemplary Embodiment 2;

FIG. 9 is a diagram showing an example of a connected terminal table in Exemplary Embodiment 2;

FIG. 12 is a sequence diagram showing an approval process in Exemplary Embodiment 3.

DETAILED DESCRIPTION

Hereinafter, exemplary embodiments of the present invention will be described with reference to the drawings.

Exemplary Embodiment 1

Figure 1:
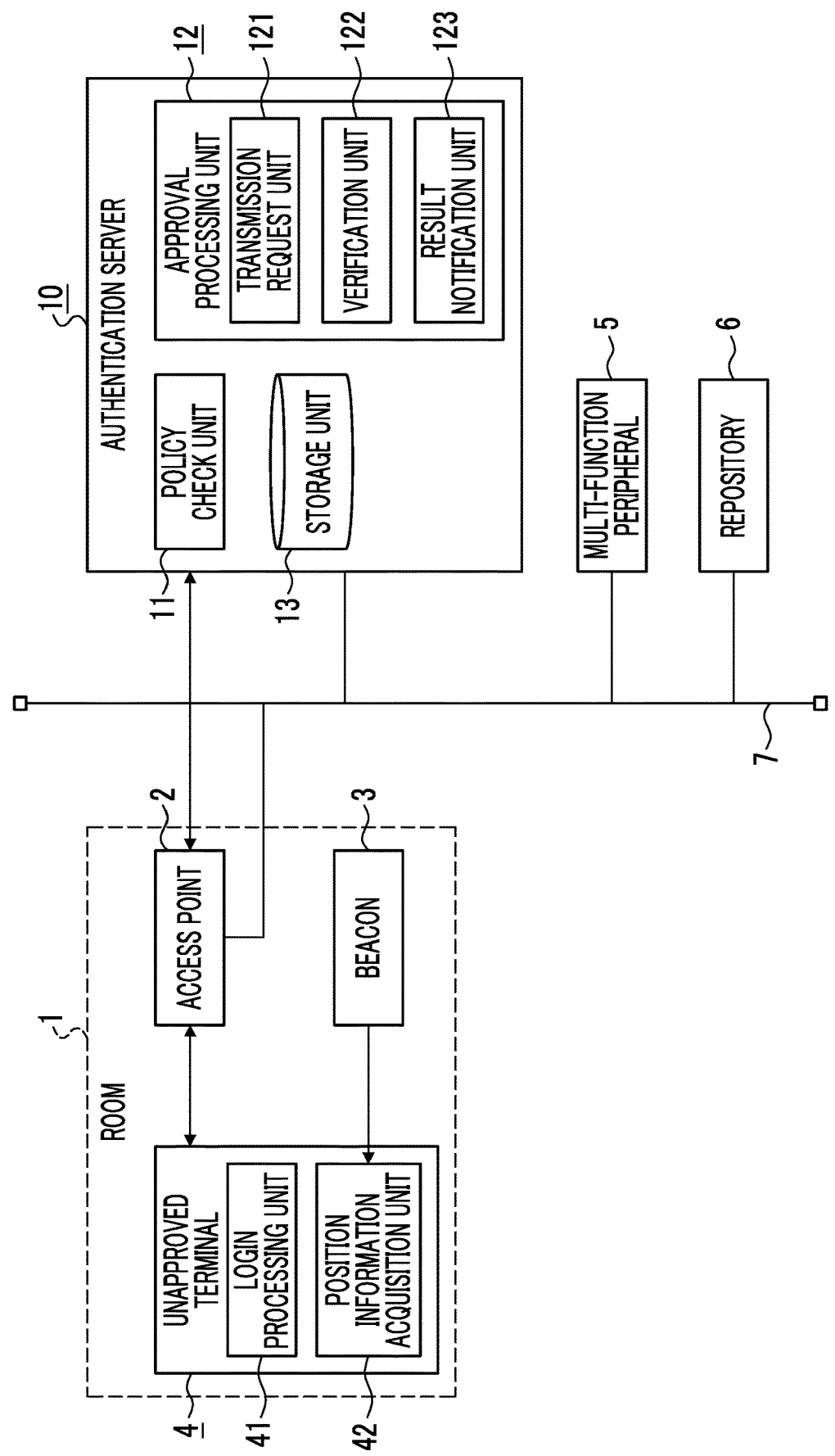
FIG. 1 is a block configuration diagram showing an authentication system according to Exemplary Embodiment 1 of the present invention.

FIG. 1 is a block configuration diagram showing an authentication system according to Exemplary Embodiment 1 of the present invention. The authentication system in the present exemplary embodiment is incorporated in a local area network (LAN) system (hereinafter, referred to as an "in-house system") constructed in a certain company, and performs user authentication in a case where a user performs network participation in the in-house system. In a case where a person who is not normally approved to perform network participation in the in-house system, in other words, a user who is not permitted to log in to the in-house system performs participates in the network, the authentication system in the present exemplary embodiment approves the user.

As shown in FIG. 1, the in-house system in the present exemplary embodiment includes an access point 2 and a beacon 3 installed in a room 1 in the company, a multi-function peripheral 5 and a repository 6 used by users of the in-house system, and an authentication server 10 connected to a LAN 7. As devices used by the users of the in-house system, the multi-function peripheral 5 and the repository 6 are shown as an example in FIG. 1, but this is an example, and the number and types of each device are not limited to the system configuration examples shown in FIG. 1.

The room 1 illustrated in FIG. 1 is a specific space in which a user who is permitted to log in to the in-house system can be located. That is, the room 1 forms a highly secure space in the facility, and not everyone is permitted to enter the room. As described above, the room 1 is a specific space in which a user who is permitted to log in to the in-house system can be located, in other words, only a trusted person can enter the room. Therefore, in a case where the user is in the room 1, it is considered that the user has been guided to the room 1 by a trusted person. Thus, in a case where it can be proved that the user is in the room 1, the user is estimated to be a trusted person even in a case where the user is not permitted to log in to the in-house system.

An unapproved terminal 4 is a terminal device used by a user who is not permitted to log in to the in-house system. A user of the unapproved terminal 4 is positioned as a user who is not trusted because personal information is not registered in the in-house system, and an outsider corresponds to this user, for example. In the present exemplary embodiment, a user who uses the unapproved terminal 4 and is not permitted to log in to the in-house system will be referred to as an "outsider" or simply a "user". Employees belonging to the same company but also employees of other business establishments may be outsiders. Since the terminal device used by this user cannot log in to the in-house system before being approved by the authentication server 10, the terminal device will be referred to as an "unapproved terminal" as described above.

The unapproved terminal 4 is a terminal device that the user brings into the room 1, and is thus a portable information processing device. For example, the terminal is a mobile PC, a tablet terminal, a smartphone, or the like. The unapproved terminal 4 includes a CPU a ROM, and a RAM as a second processor, a storage as storage means, a short-range wireless communication interface and a mobile communication interface based on Wi-Fi (registered trademark), Bluetooth (registered trademark) Low Energy (BLE), or the like as communication means, and a user interface having a touch panel, a mouse, keyboard, display, and the like.

The unapproved terminal 4 has a login processing unit 41 and a position information acquisition unit 42. Constituents not used in the description of the present exemplary embodiment are not illustrated in the drawings. The login processing unit 41 transmits a login request to the authentication server 10 via the access point 2. The position information acquisition unit 42 acquires installation position information for specifying a position where the beacon 3 is installed from the beacon 3 located closest to the authentication server 10 in response to the request from the authentication server 10, and transmits the acquired position information to the authentication server 10.

Each of the constituents 41 and 42 in the unapproved terminal 4 is realized through a cooperative operation of a computer forming the unapproved terminal 4 and a program running on a CPU mounted on the computer.

The access point 2 is a relay that performs wireless communication with a communication device located in room 1 and relays data communication performed by the communication device with the in-house system. The communication device is proved to be located in the room 1 by communicating with the access point 2 installed in the room 1. The beacon 3 is a transmitter that wirelessly transmits installation position information for specifying an installation position of the own device by using short-range wireless communication technology (for example, BLE) with low power consumption.

Although only one room 1 is shown in FIG. 2, the access point 2 and the beacon 3 are installed in other rooms with high security as in the room 1 shown in FIG. 1.

The authentication server 10 is a constituent of the authentication system in the present exemplary embodiment, and authenticates a user who uses a terminal to which a login request has been transmitted. The authentication server 10 executes an approval process for logging in to the in-house system in a case of a login request from the unapproved terminal 4. The unapproved terminal 4 is permitted to log in to the in-house system by receiving approval from the authentication server 10. The authentication server 10 may be realized by a hardware configuration of an existing general-purpose server computer. That is, the authentication server 10 includes a CPU a ROM, and a RAM as a first processor, a hard disk drive (HDD) as storage means, and a network interface provided as communication means. In a case where necessary, a user interface including input means such as a mouse and a keyboard and display means such as a display may be provided.

The authentication server 10 has a policy check unit 11, an approval processing unit 12, and a storage unit 13. Constituents not used in the description of the present exemplary embodiment are not illustrated in the drawings.

In a case where the policy check unit 11 receives a login request transmitted from the unapproved terminal 4 via the access point 2, the policy check unit 11 performs a policy check. The approval processing unit 12 executes an approval process in response to the login request transmitted from the unapproved terminal 4 and thus to determine whether or not to permit the unapproved terminal 4 to access the in-house system, that is, perform network participation in the in-house system.

The approval process executed by the approval processing unit 12 is to determine whether or not to perform network participation in the in-house system, and is different from that in user authentication for a general login request in which a user ID and a password are specified to any computer included in the in-house system. The above "login to the in-house system is permitted" or not means whether or not an unapproved terminal is connectable to the in-house system, in other words, whether or not the unapproved terminal can participate in the company network system. That is, "login to the in-house system" in the present exemplary embodiment means that an unapproved terminal is connected to the access point 2 or to the in-house system via the access point 2, in other words, it becomes possible to participate in the company network system, and is different from logging in by specifying a user ID and a password to any computer in the in-house system. However, in the present exemplary embodiment, the approval process is executed in response to the login request from a user of the unapproved terminal 4, and login to any computer of the in-house system is permitted through approval. A user ID and a password may be designated in the login request from the user of the unapproved terminal 4. Thus, the approval process executed by the approval processing unit 12 may not be completely separated from the login process to a computer. A computer to which a user's login destination may be included in the in-house system, but is not necessarily the authentication server 10.

The approval processing unit 12 has a transmission request unit 121, a verification unit 122, and a result notification unit 123. The transmission request unit 121 requests the unapproved terminal 4 to transmit position information in response to a login request transmitted from the unapproved terminal 4. The verification unit 122 verifies the position information transmitted from the unapproved terminal 4 in response to the position information transmission request by the transmission request unit 121, and permits the unapproved terminal 4 to log in to the room 1, that is, permits the unapproved terminal 4 to log in to the in-house system in a case where it is possible to verify that a user is located in a specific space where the user permitted to log in to the in-house system can be located. The result notification unit 123 notifies the unapproved terminal 4 of a result of the verification by the verification unit 122, that is, a result of determining whether or not the unapproved terminal 4 can access the in-house system. In the case of the present exemplary embodiment, permitting login of the user of the unapproved terminal 4 corresponds to a login permission notification.

As described below, various pieces of information that can be represented in a table format are stored in the storage unit 13, and specifically, are stored in various tables such as an approval policy table, a beacon management table, and a room information table.

FIG. 2 is a diagram showing an example of an approval policy table in the present exemplary embodiment. In the approval policy table, an approval method for each access point 2 included in the in-house system is set as a policy. In the approval policy information, an IP address and an approval method are set in correlation with a connection source AP. An access point ID is set in the connection source AP as identification information of the access point 2. An IP address assigned to the access point 2 is set as the IP address. As the approval method, a method for approving the unapproved terminal 4 at the access point 2 is set.

FIG. 3 is a diagram showing an example of a beacon management table according to the present exemplary embodiment. Information for managing the beacon 3 included in the in-house system is set in the beacon management table. Management information of the beacon 3 is set in correlation with a beacon, an effective distance, an adjacent AP, and a room number for each beacon 3 included in the in-house system. A beacon ID is set in the beacon as identification information of the beacon 3. In the effective distance, a distance defined as an effective range of wireless communication of the beacon 3 is set. As shown in FIG. 1, at least one access point 2 and one beacon 3 are installed in the room 1, but an access point ID is set as identification information of the access point 2 closest to the beacon 3 in the adjacent AP. In the room number, a room number is set as information for identifying the room 1 in which the beacon 3 is installed.

FIG. 4 is a diagram showing an example of a room information table in the present exemplary embodiment. In the room information table, information regarding the room 1 in which the access point 2 and the beacon 3 are installed in the in-house system is set. In the room information, a room number, a beacon, an AP, and map information are set in correlation with each room 1. In the room number, a room number is set as information for identifying the room 1. A beacon ID is set in the beacon as identification information of the beacon 3 installed in the room 1. An access point ID is set in the AP as identification information of the access point 2 installed in the room 1. Spatial information indicating characteristics of the room 1 is set in the map information. Details of the map information will be described later.

Each of the constituents 11 and 12 in the authentication server 10 is realized through a cooperative operation of a computer forming the authentication server 10 and a program running on a CPU mounted on the computer. The storage unit 13 is realized by an HDD mounted on the authentication server 10. Alternatively, storage means included in the RAM or the in-house system may be used via the LAN 7.

A program used in the present exemplary embodiment may be provided not only by communication means but also by storing the program in a computer readable recording medium such as a CD-ROM or a USB memory. Programs provided by communication means or a recording medium are installed in a computer, and various processes are realized by a CPU of the computer sequentially executing the programs.

Next, an operation in the present exemplary embodiment will be described. In the present exemplary embodiment, a process executed in a case where a user who has entered the room 1 with the unapproved terminal 4 wants to log in to the in-house system will be described with reference to a sequence diagram of FIG. 5. Since the user always carries the unapproved terminal 4, a position of the user and a position of the unapproved terminal 4 are assumed to be always the same.

First, the login processing unit 41 of the unapproved terminal 4 transmits a login request including a Media Access Control (MAC) address of the own terminal to the authentication server 10 in response to a user operation (step S401).

Figure 5:
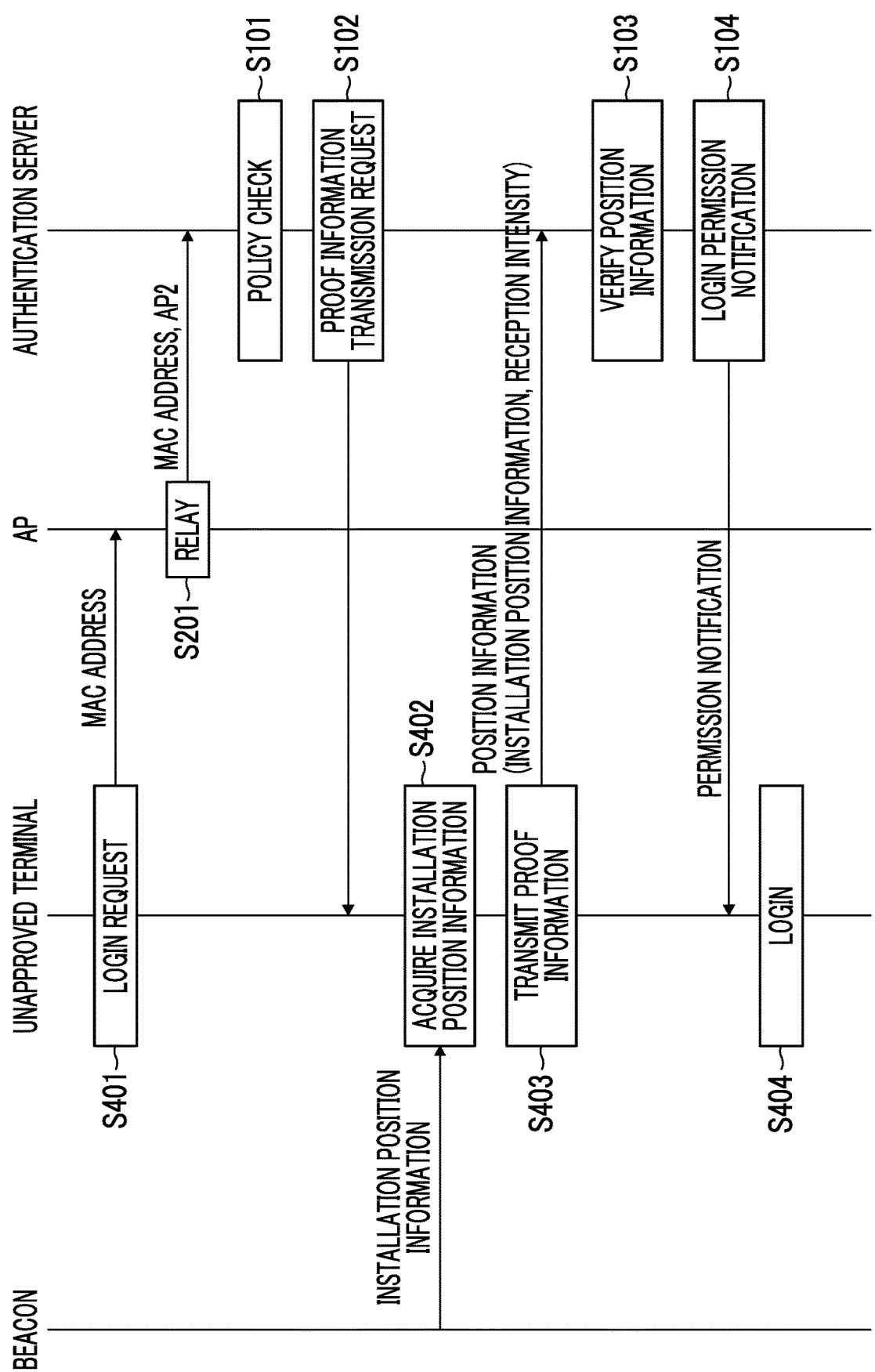
FIG. 5 is a sequence diagram showing an approval process according to Exemplary Embodiment 1.

The access point 2 relays the login request addressed to the authentication server 10 from the unapproved terminal 4 (step S201), and at this time, adds an access point ID to the login request as identification information of the own device. In FIG. 5, the access point ID added to the login request is "AP2".

The access point 2 receives the login request sent from the unapproved terminal 4 at a predetermined port that can accept the access request and relays it to the authentication server 10, but does not permit access to the in-house system. In a case where the unapproved terminal 4 is approved in response to the login request, a connection destination of the unapproved terminal 4 is changed to a port capable of performing network communication with a computer of the in-house system. The access point 2 also relays data exchanged between the authentication server 10 and a terminal such as the unapproved terminal 4 in the room 1 in the subsequent processes, but merely relays data without performing processes other than the addition of the identification information of the own device, and thus the subsequent processes in the access point 2 are not illustrated in the sequence diagram.

In a case where the login request is transmitted from the unapproved terminal 4 via the access point 2, the policy check unit 11 of the authentication server 10 collates the access point ID added to the login request with the connection source AP in the approval policy table, and thus performs policy check on the validity of the access point 2 that has relayed the login request (step S101). According to the setting example of the table shown in FIG. 2, in a case where a relay source of the login request is specified as the access point "AP2", the policy check unit 11 specifies that an approval method is "position information".

In a case where the approval method is specified as described above, the transmission request unit 121 of the approval processing unit 12 requests the unapproved terminal 4 that is a transmission source of the login request to transmit proof information according to the specified approval method (step S102). In the present exemplary embodiment, as proof information for proving that the unapproved terminal 4 is located in the room 1 shown in FIG. 1, that is, in a specific space, transmission of position information for specifying a position where the beacon 3 is installed is requested.

The position information acquisition unit 42 of the unapproved terminal 4 wirelessly receives and acquires installation position information from the beacon 3 located closest to the own terminal in response to the request from the authentication server 10 (step S402). A beacon ID is included in the installation position information.

In a case where the position information acquisition unit 42 wirelessly receives the installation position information from the beacon 3, the position information acquisition unit 42 acquires a reception intensity thereof. The position information acquisition unit 42 generates position information including the installation position information and the reception intensity, and transmits the position information to the authentication server 10 as the proof information (step S403). In a case where the position information acquisition unit 42 receives the installation position information from the plurality of beacons 3, it is determined that the beacon 3 having the highest reception intensity among respective reception intensities is set as the beacon 3 located closest to the unapproved terminal 4.

In a case where the position information is transmitted as the proof information from the unapproved terminal 4 in response to the proof information transmission request, the verification unit 122 verifies the acquired position information (step S103). Specifically, the verification unit 122 acquires an effective distance of the beacon 3 from the beacon ID included in the position information by referring to the beacon management table. An access point ID is added to the proof information, and thus the verification unit 122 can uniquely specify the effective distance to be acquired. The verification unit 122 converts the reception intensity included in the position information into a distance, and checks whether or not the converted distance, that is, a direct distance between the unapproved terminal 4 and the beacon 3 in the room 1 is the effective distance acquired from the beacon management table. In a case where the direct distance is equal to or less than the effective distance, the verification unit 122 determines that the unapproved terminal 4 is located in the room 1. That is, the beacon ID included in the position information corresponds to information for specifying a location of the unapproved terminal 4, but is also information unique to the room 1 where the unapproved terminal 4 is located in a case where the direct distance is equal to or less than the effective distance.

Incidentally, as described above, the room 1 in the present exemplary embodiment is a specific space where a user who is permitted to log in to the in-house system can be located. In other words, the user is estimated to be a trusted person because it is proved that the unapproved terminal 4 carried is in the room 1. As described above, the user is approved by borrowing the trust for the room 1. In the present exemplary embodiment, in a case where the direct distance between the unapproved terminal 4 and the beacon 3 exceeds the effective distance of the beacon 3, there is a possibility that the user may not be in the room 1, and thus the user is estimated to be untrustworthy. That is, the verification unit 122 does not permit the user to log in to the in-house system.

In a case where it is estimated that the user of the unapproved terminal 4 is trusted by being proved to be in the room 1, the result notification unit 123 notifies the unapproved terminal 4 that login is permitted (step S104).

In a case where the login processing unit 41 of the unapproved terminal 4 is permitted to log in as described above, the unapproved terminal 4 logs in to the in-house system (step S404). A method of logging in to the in-house system is not particularly mentioned, but for example, the user may log in through the same operation as that of a trusted person. Alternatively, in step S104, a login screen for logging in to the in-house system may be transmitted as a permission notification. Alternatively, in step S401, the user may display a login screen by performing a predetermined operation on the unapproved terminal 4, and may transmit the login request by entering the user ID and the password.

Incidentally, the unapproved terminal 4 proves that the user is in the room 1 by acquiring the beacon ID of the beacon 3 installed in the room 1 as the installation position information. However, regardless of whether the beacon 3 is installed or not, the user may prove to be in the room 1 by another person.

For example, in a case where the unapproved terminal 4 has a light detection and ranging (LiDAR) scanner function, this LiDAR scanner function may be used. The "LiDAR scanner function" is a function of measuring a distance of a distant object by using laser light. Therefore, the user uses the LiDAR scanner function to measure a distance to the user's surroundings, that is, a distance to an object such as a wall, a shelf, or furniture inside the room 1. Information for specifying an internal shape of the room 1 through this measurement is information unique to the room 1 and also spatial information indicating characteristics of the space of the room 1. In the map information of the room information table shown in FIG. 4, the information for specifying the internal shape of the room 1 is set.

Therefore, in a case where the spatial information acquired by using the LiDAR scanner function is transmitted from the unapproved terminal 4 as proof information, the verification unit 122 collates the spatial information with the map information set in the room information table through image analysis to determine whether or not the unapproved terminal 4 is used in the room 1. By adding the access point ID to the proof information, the verification unit 122 can uniquely specify the map information that is a collation target of the spatial information.

In a case where the unapproved terminal 4 has a camera function, it can be determined whether or not the unapproved terminal 4 is used in the room 1 in the same manner as the LiDAR scanner function. In this case, an image captured by a camera is information for specifying a location of the unapproved terminal 4, information unique to the room 1, and spatial information indicating the characteristics of the room 1. A captured image of an inside view of the room 1 is set in the map information of the room information table shown in FIG. 4.

In a case where the spatial information acquired by using the camera function is transmitted as proof information, the verification unit 122 collates the spatial information with the map information set in the room information table through image analysis to determine whether or not the unapproved terminal 4 is used in the room 1.

In a case of using the LiDAR scanner function or the camera function for acquiring spatial information, the unapproved terminal 4 acquires the spatial information instead of the installation position information in step S402.

According to the present exemplary embodiment, it is confirmed that a user who is permitted to log in to the in-house system is in the room 1 which is a specific space where the user can be located, and thus the user of the unapproved terminal 4 is estimated to be a trusted person, and the user is permitted to log in to the in-house system. Whether or not to log in is made in response to a login request from the user by using the trust for a specific space without obtaining a permission of an administrator or the like of the in-house system, and thus it is very easy to obtain the permission for login, but this does not reduce a security level of the in-house system.

Exemplary Embodiment 2

Figure 6:
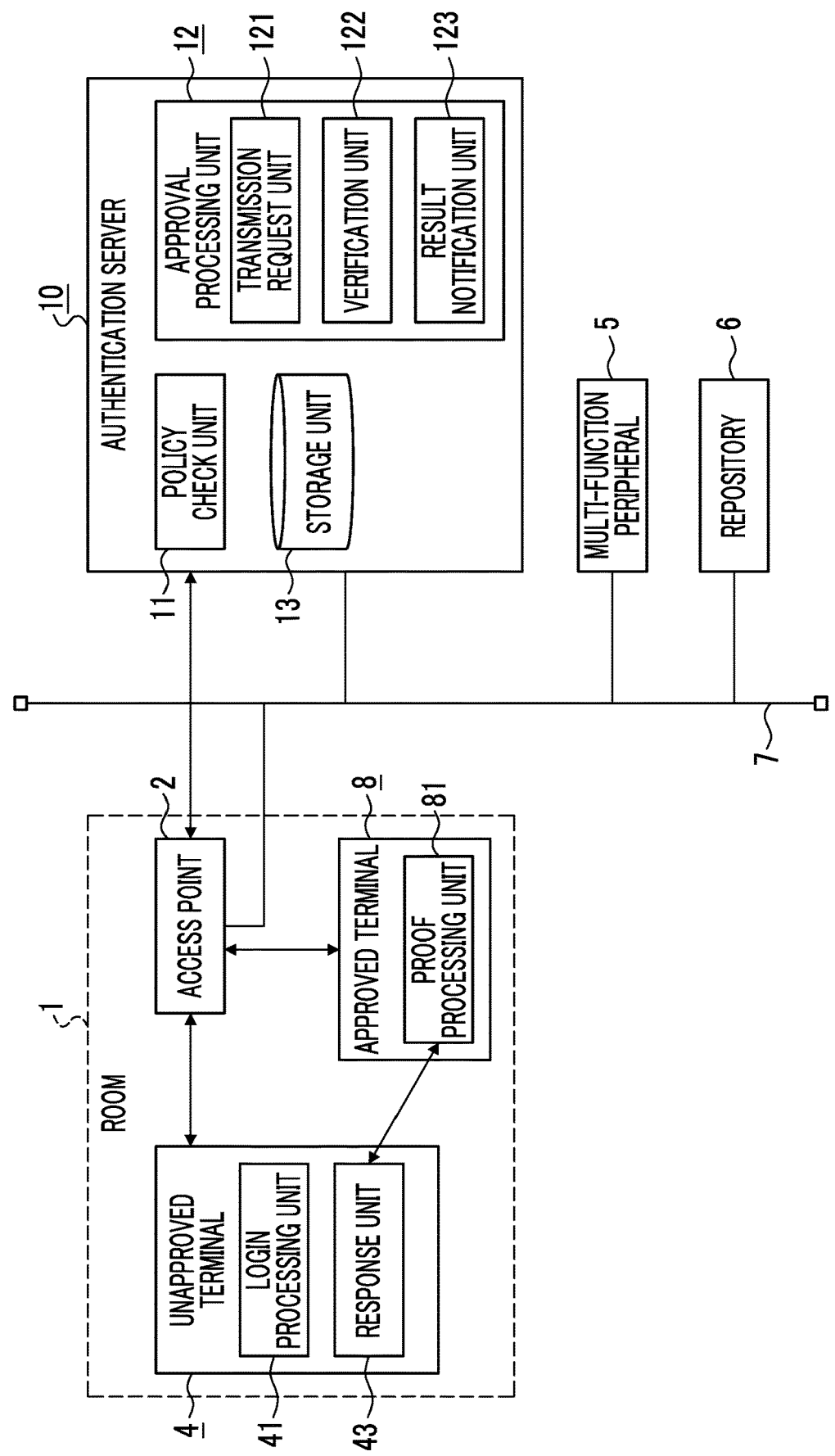
FIG. 6 is a block configuration diagram showing an authentication system according to Exemplary Embodiment 2 of the present invention.

FIG. 6 is a block configuration diagram showing an authentication system according to Exemplary Embodiment 2 of the present invention. The same constituents as those in Exemplary Embodiment 1 are given the same reference numerals, and the description thereof will be omitted as appropriate.

An approved terminal 8 is located in the room 1 in the present exemplary embodiment. On the other hand, the beacon 3 is not particularly required.

Whereas the unapproved terminal 4 is a terminal device used by a user who is not permitted to log in to the in-house system, the approved terminal 8 is a terminal device used by a user who is permitted to log in to the in-house system because the use of the in-house system has already been approved. Since a user of the unapproved terminal 4 is a person whose login to the in-house system is not approved until the user is proved to be a trusted person, the user will be referred to as an "unapproved person" for convenience of description. On the other hand, a user of the approved terminal 8 needs to be delegated to the authentication server 10 to prove that an unapproved person is a trusted person, but this user typically collaborates with the unapproved person and will thus be referred to as a "collaborative worker" for convenience of description.

The approved terminal 8 is a terminal device that a collaborative worker brings into the room 1, and is thus a portable information processing device. For example, the terminal is a mobile PC, a tablet terminal, a smartphone, or the like. The approved terminal 8 includes a CPU a ROM, and a RAM as a third processor, a storage as storage means, a short-range wireless communication interface and a mobile communication interface based on Wi-Fi (registered trademark), BLE, or the like as communication means, and a user interface having a touch panel, a mouse, keyboard, display, and the like.

The approved terminal 8 has a proof processing unit 81. Constituents not used in the description of the present exemplary embodiment are not illustrated in the drawings. The proof processing unit 81 proves that an unapproved person is a trusted person. Therefore, the proof processing unit 81 generates electronic signature data in response to the request for transmission of the proof information from the authentication server 10 and transmits the electronic signature data to the authentication server 10 as proof information. The proof processing unit 81 of the approved terminal 8 is realized through a cooperative operation between a computer forming the approved terminal 8 and a program running on a CPU mounted on the computer.

The authentication server 10 may have the same configuration as that in Exemplary Embodiment 1. However, as will be described in detail later, the details of the proof information to be handled are different.

Various pieces of information that can be represented in a table format are stored in the storage unit 13. Specifically, in addition to the same approval policy table as in Exemplary Embodiment 1, the information is stored in various tables such as an access point management table, an approved terminal management table, and a connected terminal table.

FIG. 7 is a diagram showing an example of an access point management table in the present exemplary embodiment. Management information of the access point 2 included in the in-house system is set in the access point management table. An IP address, a management terminal, and a delegation destination are set in correlation with an AP in the management information of the access point 2. An access point ID is set in the AP as identification information of the access point 2. An IP address, which is unique address information of the access point 2, is set in the IP address. A terminal ID is set in the management terminal as terminal identification information used by an administrator of the access point 2. In the present exemplary embodiment, the proof for recognizing an unapproved person as a trusted person is delegated to a collaborative worker, but information for specifying the collaborative worker who is a delegation destination is set in the delegation destination.

FIG. 8 is a diagram showing an example of an approved terminal management table in the present exemplary embodiment. In the approved terminal management table, management information regarding the approved terminal 8 used by a collaborative worker who is permitted to log in to the in-house system is set. A user, a role, and a public key are in correlation with a terminal in the management information regarding the approved terminal 8. A terminal ID is set in the terminal as identification information of the approved terminal 8. A user ID is set in the user as identification information of a user who uses the approved terminal 8. A role of the user in the in-house system is set in the role. FIG. 8 illustrates an example in which "authority" indicating a person who has the authority to approve an unapproved person and "normal user" indicating a person who does not have the authority are shown as examples set in the role. A public key required for verification of an electronic signature by the user is set in the public key.

FIG. 9 is a diagram showing an example of a connected terminal table in the present exemplary embodiment. The approved terminals 8 connected to the in-house system are registered in the connected terminal table. In the connected terminal table, an IP address, a connection source AP, and a salt are set in a terminal. A terminal ID is set in the terminal as identification information of the approved terminal 8 connected to the in-house system. An IP address assigned to the approved terminal 8 is set in the IP address. An access point ID is set in the connection source AP as identification information of the access point 2 to which the approved terminal 8 is wirelessly connected. The "salt" is a random code string, but a salt is set as authentication data to be included in a request for transmission of the proof information to the approved terminal 8 is set in the salt included in the connected terminal table.

The unapproved terminal 4 has a login processing unit 41 and a response unit 43. The login processing unit 41 is the same as that in Exemplary Embodiment 1. The response unit 43 responds to a confirmation inquiry from the approved terminal 8. The response unit 43 is realized through a cooperative operation of a computer forming the unapproved terminal 4 and a program running on a CPU mounted on the computer.

In the above Exemplary Embodiment 1, the room 1 is a specific space where a user who is permitted to log in to the in-house system can be located, in other words, a space that only a trusted person can enter, and an unapproved person borrows the trust for the room 1 by being proved to be in the room 1 and is thus permitted to log in to the in-house system. In the present exemplary embodiment, instead of the presence or absence in the room 1, the vicinity of the approved terminal 8 used by a collaborative worker is a specific space, and an unapproved person borrows the trust of a nearby collaborative worker by being proved to be in the vicinity of the collaborative worker and is thus permitted to log in to the in-house system.

Figure 10:
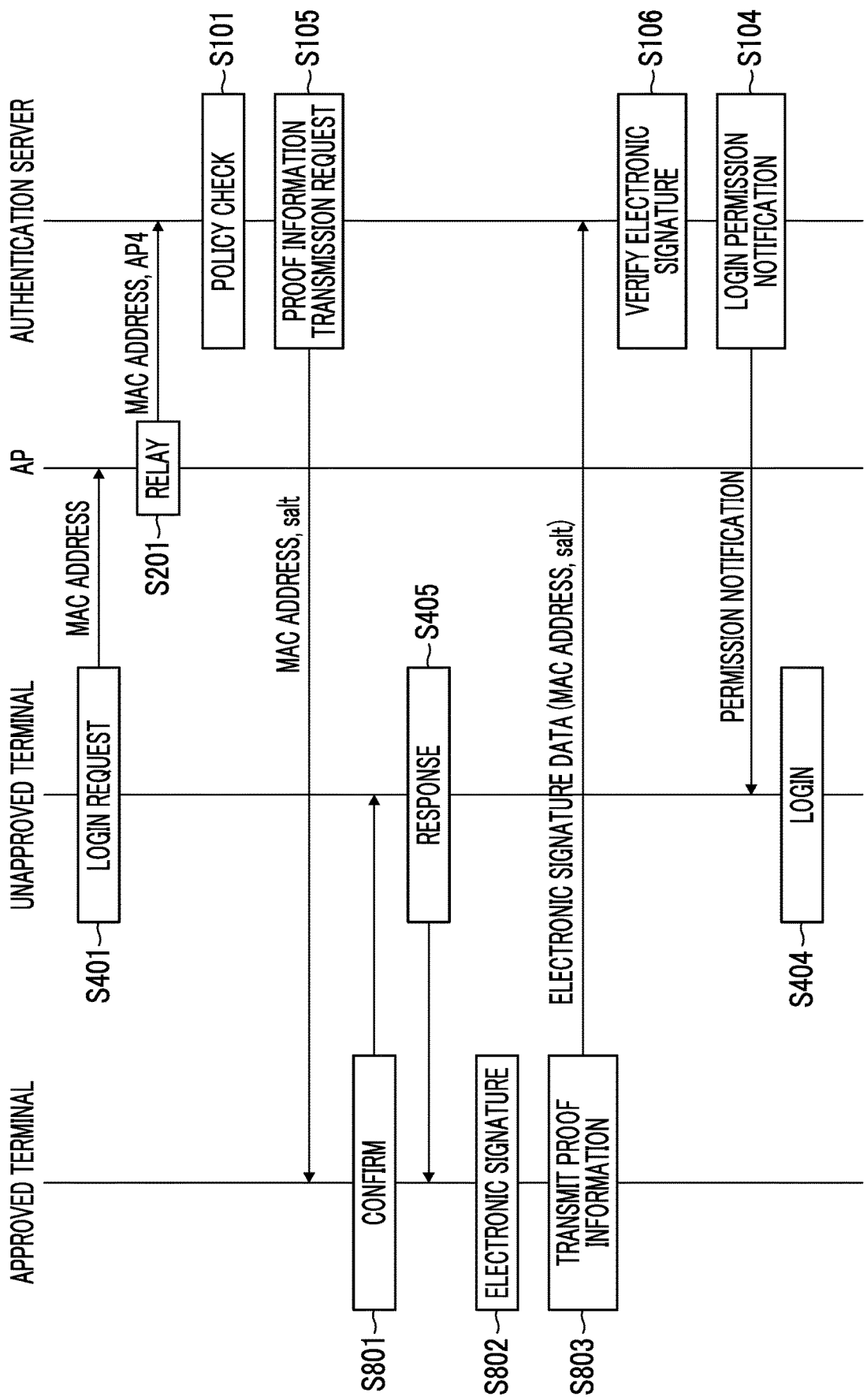
FIG. 10 is a sequence diagram showing an approval process in Exemplary Embodiment 2.

Hereinafter, a process executed in a case where a user who has entered the room 1 with the unapproved terminal 4 wants to log in to the in-house system will be described. FIG. 10 is a sequence diagram showing this process, and is a diagram corresponding to FIG. 5 used for describing the process in Exemplary Embodiment 1. In FIG. 10, the same process as in FIG. 5 is given the same step number, and the description thereof will be omitted as appropriate. Since a collaborative worker always carries the approved terminal 8, a position of the collaborative worker and a position of the approved terminal 8 are assumed to be always the same.

The login processing unit 41 of the unapproved terminal 4 transmits a login request including a MAC address to the authentication server 10 in the same manner as in Exemplary Embodiment 1 (step S401). The access point 2 relays the login request addressed to the authentication server 10 from the unapproved terminal 4 (step S201), and at this time, adds an access point ID to the login request as identification information of the own device. In the present exemplary embodiment, as shown in FIG. 10, the access point ID added to the login request is "AP4".

In a case where the policy check unit 11 of the authentication server 10 performs a policy check on the basis of the login request (step S101), an approval method is specified as "delegation" from the access point ID "AP4".

In Exemplary Embodiment 1 in which the approval method is "position information", the authentication server 10 verifies a location of a user (that is, an unapproved person) of the unapproved terminal 4 by itself, and estimates the unapproved person to be a trusted person in a case where the unapproved person is in the room 1. In contrast, the present exemplary embodiment in which the approval method is "delegation" has a feature that the proof that an unapproved person is a trusted person is delegated to a collaborative worker. That is, the unapproved person borrows the trust for the room 1 in Exemplary Embodiment 1 in order to be able to log in to the in-house system, but in the present exemplary embodiment, borrows the trust of the collaborative worker.

Incidentally, according to the setting details of the access point management table, a delegation destination in the access point ID "AP4" is "only management terminal". Therefore, as the delegation destination, the approved terminal 8 having the terminal ID "X" set in the management terminal can be uniquely specified. Here, referring to the connected terminal table shown in FIG. 9, the approved terminal 8 having the terminal ID "X" (hereinafter referred to as an "approved terminal X") is currently connected to the in-house system. In this case, the transmission request unit 121 of the approval processing unit 12 requests the approved terminal 8 to transmit electronic signature data as proof information according to the specified approval method (step S105). A MAC address of the unapproved terminal 4 that is a transmission source of the login request and a salt generated by the transmission request unit 121 in response to the request are added to the transmission request for the proof information. In the present exemplary embodiment, the generated salt is correlated with the approved terminal X that is a request transmission destination and registered in the connected terminal table shown in FIG. 9, but the present exemplary embodiment is not limited to this, and for example, the generated salt may be stored in correlation with the unapproved terminal 4 or the transmission request in a table (not shown).

In a case of receiving the transmission request for the proof information transmitted from the authentication server 10, the proof processing unit 81 of the approved terminal X performs confirmation to the unapproved terminal 4 that can be specified from the MAC address (step S801). Information necessary for this confirmation is transmitted by using BLE. By using BLE, it can be proved that the unapproved person is in the vicinity of the collaborative worker. The details to be confirmed are that the unapproved person wants to log in, the propriety of generation of an electronic signature, and the like.

The response unit 43 of the unapproved terminal 4 responds to the confirmation from the approved terminal 8 (step S405). This response proves that the unapproved person is in the vicinity of the collaborative worker and that the confirmation is correct.

In a case where there is a response from the unapproved terminal 4, the proof processing unit 81 of the approved terminal X electronically signs the MAC address and the salt of the unapproved terminal 4 received from the authentication server 10 (step S802), transmits the electronic signature data to the authentication server 10 as proof information (step S803).

In the above description, the proof processing unit 81 of the approved terminal 8 cooperates with the response unit 43 of the unapproved terminal 4 to automatically generate the electronic signature data as proof information, but each process of confirmation to the unapproved terminal 4 and transmission of electronic signature and proof information to the authentication server 10 (steps S801 to S803) may be executed according to an instruction from a collaborative worker. For example, the proof processing unit 81 displays confirmation details on a screen in response to a proof information transmission request from the authentication server 10. The details to be displayed are that an unapproved person wants to log in, the propriety of an electronic signature, the correctness of a MAC address transmitted from the authentication server 10, and the like. The collaborative worker may confirm the displayed details by showing the displayed details to the unapproved person (step S801), and the unapproved person may respond by seeing the details displayed on the screen (step S405). Since the screen of the approved terminal 8 is presented to the unapproved person, it can be proved that the unapproved person is in the vicinity of the collaborative worker.

In a case where the electronic signature data is transmitted as the proof information from the approved terminal 8 in response to the proof information transmission request, the verification unit 122 verifies the acquired electronic signature data (step S106). Specifically, the verification unit 122 takes out the public key of the approved terminal X from the approved terminal management table and decrypts the electronic signature data. A decrypted salt is collated with the salt of the approved terminal X included in the connected terminal table. A decrypted MAC address is collated with the MAC address acquired from the unapproved terminal 4. Here, it has been described that the salt and the MAC address are collated individually. For example, a hash value may be calculated by mixing the decrypted salt and the MAC address, and the calculated hash value may be collated with a hash value calculated by mixing the transmitted salt and MAC address. In a case where the verification unit 122 succeeds in the collation based on the salt and the MAC address, the verification unit 122 approves the unapproved person as a trusted person and permits the login to the in-house system. On the other hand, the verification unit 122 does not permit the unapproved person to log in to the in-house system in a case where the salt and the MAC address do not match as a result of the collation.

As described above, in a case where the verification unit 122 can verify that the electronic signature data is generated by the approved terminal 8 in cooperation with the unapproved terminal 4 from the electronic signature data transmitted from the approved terminal 8, the unapproved person is considered as being in the vicinity of the collaborative worker, and thus the unapproved person is estimated to be a trusted person. The fact that the electronic signature data has been generated by the approved terminal 8 can be proved by the fact that the electronic signature data can be decrypted with the public key registered in the approved terminal management table. Since the MAC address of the unapproved terminal 4 is included in the electronic signature, it is estimated that the approved terminal 8 and the unapproved terminal 4 cooperate with each other. In the above process example, the authentication server 10 transmits the MAC address of the unapproved terminal 4 to the approved terminal 8 in step S105, but the approved terminal 8 may acquire the MAC address from the unapproved terminal 4 in step S405, electronically sign the acquired MAC address, and transmit the MAC address to the authentication server 10. Consequently, in a case where the MAC address obtained from the approved terminal 8 matches the MAC address obtained from the unapproved terminal 4 in step S401, the verification unit 122 can more reliably prove that the approved terminal 8 and the unapproved terminal 4 cooperate with each other.

In a case where it is estimated that the unapproved person is a trusted person by being proved to be in the vicinity of the collaborative worker, the result notification unit 123 notifies the unapproved terminal 4 that login is permitted (step S104). Consequently, the unapproved person can log in to the in-house system (step S404).

In the present exemplary embodiment, a range in which the approved terminal 8 can perform wireless communication using BLE is regarded as being in the vicinity of the collaborative worker. However, since the unapproved person is considered to be acting with the collaborative worker, in a case where the unapproved person is in the same room 1 as the collaborative worker, or in one section of the room 1, or on the same floor, the unapproved person may be regarded as being in the vicinity of the collaborative worker. Alternatively, conversely, in a case where the unapproved person is within the range in which the approved terminal 8 can perform wireless communication using BLE, the unapproved person may be considered as being in the vicinity of the collaborative worker even in a case where the unapproved person is outside the room 1. Regardless of how a range of the vicinity of the collaborative worker is defined, in the present exemplary embodiment, the unapproved person can borrow the trust of the collaborative worker instead of the room 1 and log in to the in-house system under the control of the collaborative worker.

In the present exemplary embodiment, since it is premised that the approved terminal 8 and the unapproved terminal 4 exchange data by using BLE, it is obvious that the unapproved person is in the vicinity of the collaborative worker. However, for example, the beacon 3 may be used as in Exemplary Embodiment 1, and the authentication server 10 may acquire the position information described in Exemplary Embodiment 1 from each of the approved terminal 8 and the unapproved terminal 4, and compare the position information to prove that the collaborative worker and the unapproved person are in the same room 1, that is, the unapproved person is in the vicinity of the collaborative worker.

Exemplary Embodiment 3

Figure 11:
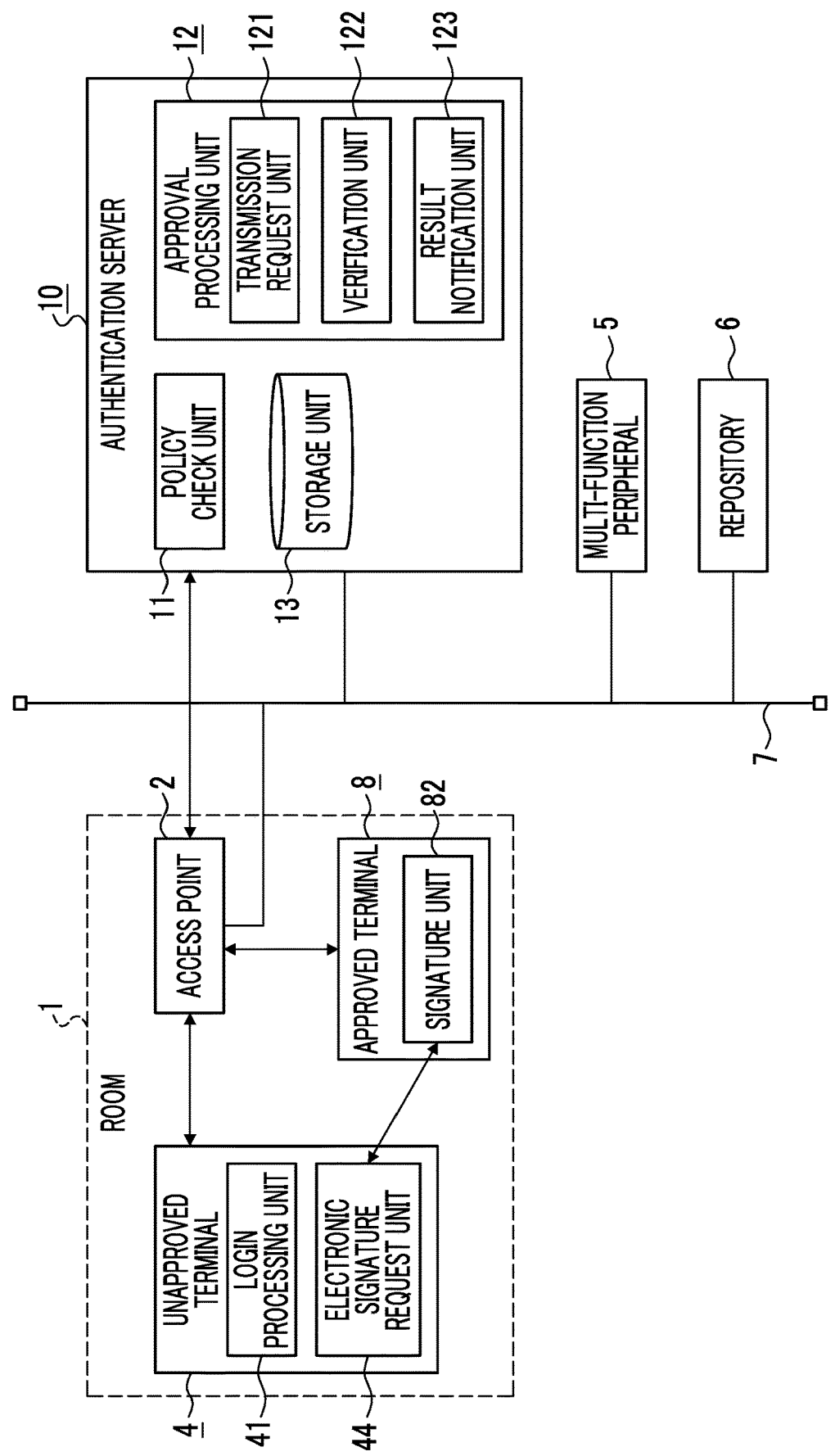
FIG. 11 is a block configuration diagram showing an authentication system according to Exemplary Embodiment 3 of the present invention.

FIG. 11 is a block configuration diagram showing an authentication system according to Exemplary Embodiment 3 of the present invention. The same constituents as those in Exemplary Embodiments 1 and 2 are given the same reference numerals, and the description thereof will be omitted as appropriate.

A system configuration in the present exemplary embodiment may be the same as that in Exemplary Embodiment 2. However, the unapproved terminal 4 includes an electronic signature request unit 44 instead of the response unit 43. The approved terminal 8 includes a signature unit 82 instead of the proof processing unit 81.

The electronic signature request unit 44 of the unapproved terminal 4 requests the approved terminal 8 to execute an electronic signature in response to a proof information transmission request from the authentication server 10. The electronic signature request unit 44 is realized through a cooperative operation of a computer forming the unapproved terminal 4 and a program running on a CPU mounted on the computer.

The signature unit 82 of the approved terminal 8 performs an electronic signature in response to a request from the unapproved terminal 4. The signature unit 82 is realized through a cooperative operation of a computer forming the approved terminal 8 and a program running on a CPU mounted on the computer.

An operation in the present exemplary embodiment may be basically the same as that in Exemplary Embodiment 2. However, the authentication server 10 is different from that in Exemplary Embodiment 2 in that the authentication server 10 requests the unapproved terminal 4 to transmit proof information. Hereinafter, a process executed in a case where a user who has entered the room 1 with the unapproved terminal 4 wants to log in to the in-house system will be described with reference to a sequence diagram shown in FIG. 12. FIG. 12 is a diagram corresponding to FIG. 5 in Exemplary Embodiment 1 and FIG. 10 in Exemplary Embodiment 2. Therefore, in FIG. 12, the same processes as those in FIGS. 5 and 10 are given the same step numbers, and the description thereof will be omitted as appropriate.

The login processing unit 41 of the unapproved terminal 4 transmits a login request including an MAC address to the authentication server 10 in the same manner as in Exemplary Embodiment 2 (step S401). The access point 2 relays the login request from the unapproved terminal 4 to the authentication server 10 (step S201), and at this time, adds the access point ID "AP4" to the login request.

In a case where the policy check unit 11 of the authentication server 10 performs a policy check on the basis of the login request (step S101), an approval method is specified as "delegation" from the access point ID "AP4".

According to the setting details of the access point management table, a delegation destination in the access point ID "AP4" can be specified as the approved terminal X. However, unlike the case of Exemplary Embodiment 2, it is assumed that the approved terminal X is not connected to the in-house system. That is, the information regarding the approved terminal X is not registered in the connected terminal table shown in FIG. 9. In this case, since proof information cannot be transmitted to the approved terminal 8, the transmission request unit 121 of the approval processing unit 12 requests the unapproved terminal 4 to transmit electronic signature data generated by the approved terminal 8 as the proof information (step S107). The transmission request unit 121 adds a salt generated thereby to the transmission request for the proof information.

In a case of receiving the transmission request for the proof information transmitted from the authentication server 10, the electronic signature request unit 44 of the unapproved terminal 4 requests the approved terminal X to perform an electronic signature by using BLE (step S406). The MAC address of the own terminal and the salt received from the authentication server 10 are added to this request. Also, by using BLE, it is proved that the unapproved person is in the vicinity of the collaborative worker.

Incidentally, although the approved terminal X is not connected to the in-house system, it is considered that the collaborative worker is in the same room 1 because of being acting together with the unapproved person. Therefore, in a case where an electronic signature is requested from the unapproved terminal 4, the signature unit 82 of the approved terminal X electronically signs the MAC address and the salt of the unapproved terminal 4 received from the unapproved terminal 4 (step S802), and transmits the electronic signature data to the unapproved terminal 4 (step S804).

In a case where the electronic signature data is transmitted from the approved terminal 8, the unapproved terminal 4 transmits the electronic signature data as proof information to the authentication server 10 (step S407).

In a case where the electronic signature data is transmitted as the proof information from the approved terminal 8 in response to the proof information transmission request, the verification unit 122 verifies the acquired electronic signature data (step S106), and the subsequent processes may be the same as those in Exemplary Embodiment 2, and thus the description thereof will be omitted.

The present exemplary embodiment in which a transmission source of the electronic signature data is the unapproved terminal 4 is different from Exemplary Embodiment 2 in which a transmission source is the approved terminal 8, but in the same manner as in Exemplary Embodiment 2, the verification unit 122 in the present exemplary embodiment regards the unapproved person as being in the vicinity of the collaborative worker and estimates the unapproved person as a trusted person in a case where it is possible to verify from the electronic signature data that the electronic signature data has been generated by the approved terminal 8 in cooperation with the unapproved terminal 4. The fact that the electronic signature data has been generated by the approved terminal 8 can be proved by the fact that the electronic signature data can be decrypted with the public key registered in the approved terminal management table. Since the electronic signature includes the MAC address of the unapproved terminal 4, the verification unit 122 can verify that the electronic signature data is generated by the approved terminal 8 in cooperation the unapproved terminal 4.

Incidentally, as described above, in the present exemplary embodiment, since the approved terminal X is not connected to the in-house system, in other words, the approved terminal X is not logged in to the in-house system and does not participate in the network, the unapproved terminal 4 is requested to transmit proof information. In this case, as described above, the approved terminal X is not registered in the connected terminal table shown in FIG. 9.

Here, in the access point management table shown in FIG. 7, it is assumed that "all authorities" are set as delegation destinations of the access point "AP4" instead of "only management terminal". Here, according to the approved terminal management table shown in FIG. 8, as a terminal of which the role is "authority", in addition to the approved terminal X, there is the approved terminal 8 having the terminal ID "B" (hereinafter, referred to as an "approved terminal B"). According to the setting example of the connected terminal table shown in FIG. 9, the approved terminal B is connected to the in-house system. In this case, the transmission request unit 121 of the authentication server 10 may request the approved terminal B to transmit the proof information. In this case, the same process as in Exemplary Embodiment 2 is executed with the approved terminal B as the approved terminal 8.

In each of the above exemplary embodiments, the process for connecting the unapproved terminal 4 to the in-house system has been described, but the processes described in each exemplary embodiment may be appropriately combined and executed within a consistent scope.

In Exemplary Embodiments 2 and 3, the approved terminal 8 generates the electronic signature data, but instead of the electronic signature, for example, any information that can be proved to be generated by the approved terminal 8, such as authentication information registered in advance in the authentication server 10, may be used.

In each of the above exemplary embodiments, the case where the authentication system is incorporated into the in-house system of a certain company has been described as an example, but there is no limitation to this, and in a case where a plurality of users perform collaborative work, the collaborative work is performed, the authentication system may be applied to a facility where the collaborative work is performed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication system comprising:
an authentication server that has a first hardware processor and authenticates users who use terminals to which login requests for a network system have been transmitted;
a first terminal that has a second hardware processor and is used by a user who is not permitted to log into the network system, wherein the first terminal receives a login request and the second hardware processor is configured to transmit the login request received by the first terminal to the authentication server through an access point for requesting a login process to a network, wherein the login request transmitted from the first terminal is modified by the access point by attaching an identification of the access point to the login request, and
a second terminal that is used by a user who is permitted to log into the network system;
wherein the first hardware processor is configured to:
receive the login request from the first terminal and the identification of the access point attached to the login request and in response to the login request from the first terminal, transmit a request including authentication information to the first terminal requesting the first terminal to transmit proof information for proving that the first terminal is located in a specific space,
receive proof information including authentication information from the second hardware processor;
verify whether the first terminal is located in the specific space with the second terminal on the basis of identification of the access point and verification of whether the received proof information is verified as generated by the second terminal and transmitted from the first terminal and permit the first terminal to log into the network system when verification of the first terminal is successful; and
deny the first terminal permission to log into the network system when the authentication data included in the request for proof information does not match the authentication data in the received proof information.

2. The authentication system according to claim 1, wherein the information for specifying the location of the first terminal is information unique to a space where the first terminal is located, the information unique to the space includes the identification of the access point.

3. The authentication system according to claim 2, wherein the information unique to the space is installation position information of a transmitter acquired from the transmitter located closest to the first terminal, or spatial information indicating characteristics of the space where the first terminal is located, acquired by using a function of the first terminal.

4. The authentication system according to claim 1, wherein the first hardware processor is further configured to:
determine a policy for authenticating the first terminal for logging in to the network based on the identification of the access point,
wherein permission for the first terminal to log in to the network is further based on proof information corresponding to the determined policy.

5. An authentication server that authenticates users who use terminals to which login requests for a network system have been transmitted through an access point, comprising:
a first hardware processor configured to:
receive a login request transmitted from a second hardware processor of a first terminal, where the first terminal is used by a user who is not permitted to log into the network system, where the login request is transmitted from the first terminal through the access point for requesting a login process to the network system and the login request is modified by the access point by attaching an identification of the access point to the login request which is received by the first hardware processor;
in response to the login request from the first terminal, transmit a request including authentication information requesting transmission of proof information proving that the first terminal is located in a specific space,
receive proof information including authentication information from the second hardware processor;
verify whether the first terminal is located in the specific space with a second terminal that is used by a user who is permitted to log into the network system, wherein verification of the first terminal is performed on the basis of identification of the access point and verification of whether the received proof information was generated by the second terminal in cooperation with the first terminal and permit the first terminal to log into the network system when verification of the first terminal is successful; and
deny the first terminal permission to log into the network system when the authentication data included in the request for proof information does not match the authentication data in the received proof information.

6. The authentication system according to claim 5, wherein the first hardware processor is configured to request the first terminal to transmit the proof information in response to the login request from the first terminal.

7. The authentication system according to claim 5, wherein the first hardware processor is configured to request the second terminal to transmit the proof information in response to the login request from the first terminal.

8. A non-transitory computer readable medium storing a program causing a computer that forms an authentication server that authenticates users who use terminals to which login requests for a network system have been transmitted through an access point, to realize a function of:
receiving, by a first hardware processor of the authentication server a login request transmitted from a second hardware processor of a first terminal, where the first terminal is used by a user who is not permitted to log into the network system, where the login request is transmitted from the first terminal through the access point for requesting a login process to the network system and the login request is modified by the access point by attaching an identification of the access point to the login request which is received by the first hardware processor;

in response to the login request from the first terminal, transmitting by the first hardware processor, a request including authentication information requesting transmission of proof information proving that the first terminal is located in a specific space, receiving, by the first hardware processor, proof information including authentication information from the second hardware processor;

verifying, by the first hardware processor, whether the first terminal is located in the specific space with a second terminal that is used by a user who is permitted to log into the network system, wherein verification of the first terminal is performed on the basis of identification of the access point and verification of whether the received proof information was generated by the second terminal in cooperation with the first terminal and permit the first terminal to log into the network system when verification of the first terminal is successful; and denying, by the first hardware processor, the first terminal permission to log into the network system when the authentication data included in the request for proof information does not match the authentication data in the received proof information.

* * * * *